April 14, 1925.
A. BERGGREN
1,533,963
DISTRIBUTOR ATTACHMENT TO THRASHING MACHINES
Filed Dec. 11, 1924
2 Sheets-Sheet 1
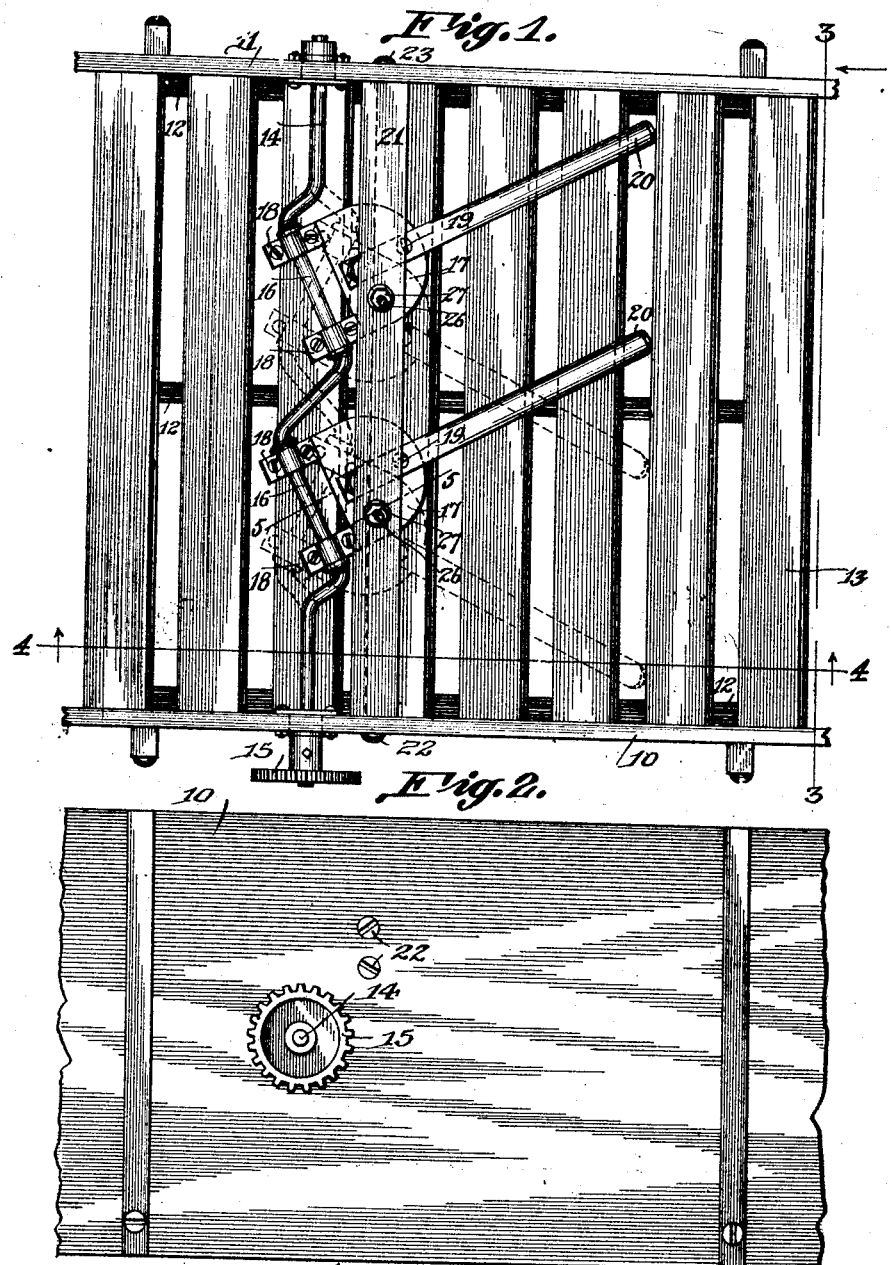
August Berggren, INVENTOR.
BY
Geo. P. Kimmel, ATTORNEY.

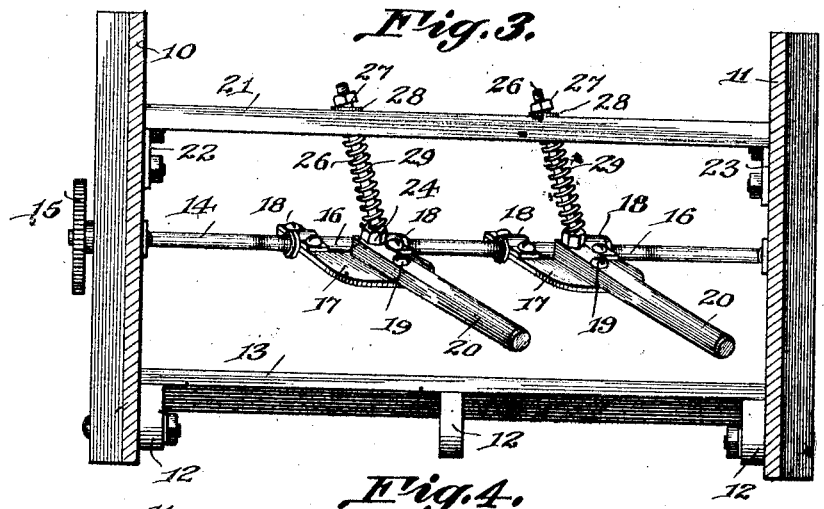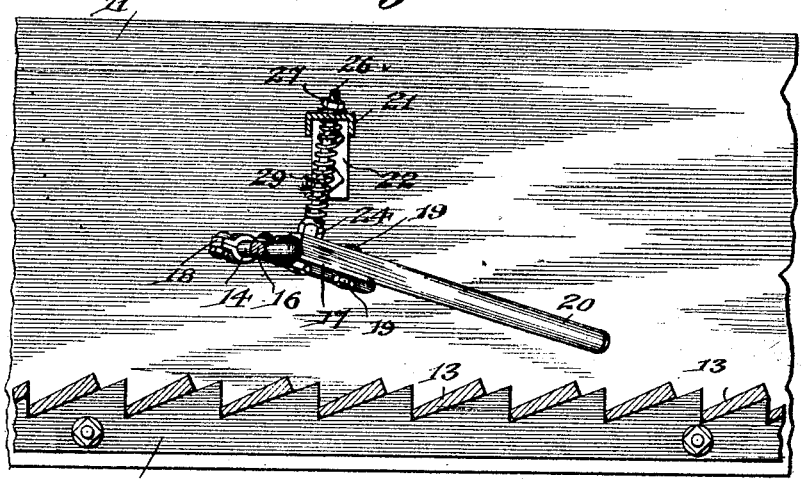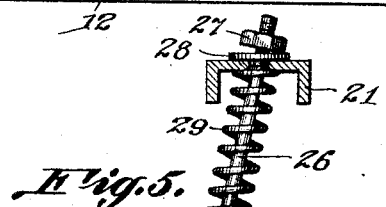

Patented Apr. 14, 1925.

1,533,963

UNITED STATES PATENT OFFICE.

AUGUST BERGGREN, OF EAGLE BEND, MINNESOTA.

DISTRIBUTOR ATTACHMENT TO THRASHING MACHINES.

Application filed December 11, 1924. Serial No. 755,818.

*To all whom it may concern:*

Be it known that I, AUGUST BERGGREN, a citizen of the United States, residing at Eagle Bend, in the county of Todd and State of Minnesota, have invented certain new and useful Improvements in Distributor Attachments to Thrashing Machines, of which the following is a specification.

This invention relates to attachments to thrashing machines and similar separating machinery for the purpose of assisting in evenly and uniformly distributing the material as it comes from the beater cylinder or the like over the surface of the feeding devices, and for disintegrating or loosening the masses of the straw, especially when tightly compressed or when wet or entangled, and has for one of its objects to simplify and improve the construction and increase the efficiency of devices of this character.

Another object of the invention is to provide a device of this character which may be installed in thrashing machines and the like of various forms and makes without material structural change.

With these and other objects in view the invention consists in certain novel features of construction as hereinafter shown and described and then specifically pointed out in the claims, and in the drawings illustrative of the preferred embodiment of the invention.

Figure 1 is a plan view of a portion of thrashing machine frame including a portion of the feeding pan, with the improved attachment applied.

Figure 2 is a side elevation of the exterior of the frame disclosed in Figure 1.
Figure 3 is a transverse section on the line 3—3 of Figure 1, looking in the direction of the arrow.

Figure 4 is a longitudinal section on the line 4—4 of Figure 1, looking in the direction of the arrow.

Figure 5 is an enlarged detail in section on line 5—5 of Figure 1.

The improved device is designed to be located between the side walls of a thrashing machine or the like, and above the slatted straw rack, and preferably relatively close to the cylinder and its concave, and in position to operate on the grain and straw as they leave the cylinder, but as the cylinder and concave form no part of the present invention they are not shown.

Portions of the side walls of a thrashing machine are represented at 10 and 11, portions of the supports for the grain pan at 12 and a plurality of the slats of the straw rack at 13, of the usual construction.

Mounted for rotation through the side walls 10 and 11 is a shaft 14 having means at one end, such as a gear or chain wheel 15, for rotating the same. The shaft 14 is formed with a plurality of cranks 16 directed obliquely to the longitudinal axis of the shaft. Two of the cranks are shown, but any required number may be employed, as required.

A plate 17 is coupled to each of the cranks by spaced clips 18, so that the cranks will rotate relative to the plate and its attachments.

Attached at 19 to each plate 17 is a bar 20 which extends for some distance away from the crank shaft, as shown.

A rigid support 21 extends between the side walls 10 and 11 and is attached thereto at 22, 23.

One of the fastening devices 19 is extended and formed into a semi-globular socket 24, and movably mounted in each socket by a globular terminal 25, is a rod 26, the upper end of each of the rods being extended through the support 21 and movably coupled thereto by a nut 27 and washer 28.

A spring 29 surrounds the rod 26 and bears at its ends respectively against the socket 24 and the support 21, as shown more clearly in Figure 5.

By this arrangement as the shaft 14 is rotated by power applied to the wheel 15, the coaction of the cranks, bars and springs will cause the outer free ends of each of the bars 20 to first move downwardly for a short distance, thence laterally in one direction for a longer distance, thence upwardly for a short distance and thence laterally in the opposite direction for a relatively long distance, and cause the mass of material passing over the straw rack to be effectually disintegrated or loosened and uniformly distributed over the straw rack, and disposed in the best condition for the further action of the separating operations.

The improved device is especially efficacious upon wet and tangled masses of material.

The improved device is simple in construction, and can be inexpensively manufactured and applied to various constructions of thrashing machines and the like, and without interfering with the usual parts of the machine.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed is:

1. In an apparatus of the class described, a shaft having a plurality of cranks directed obliquely to the longitudinal axis thereof, a plate mounted for rotation upon each of said cranks, a bar rigidly attached to each of said plates, a socket device carried by each of said bars, a stationary support, a rod for each of said bars and movable at one end through said support and respectively engaging the sockets of the bars at the other end, and a spring for each of said rods and operating between each of the bars and said support.

2. In an apparatus of the class described, a shaft having a plurality of cranks directed obliquely to the longitudinal axis thereof, a bar rotative relative to each of said cranks, a socket device carried by each of said bars, a stationary support, a rod for each of said bars and movable at one end through said support and respectively engaging the sockets of the bars at the other end, and a spring for each of said rods and operating between each of the bars and the supports.

3. In an apparatus of the class described, a supporting frame including vertical sides, a plurality of spaced raddle devices extending transversely of the frame, a shaft mounted for rotation through the frame sides above the line of the raddle devices and having a plurality of cranks directed obliquely to the longitudinal axis of the shaft, a bar rotative to each of said cranks, a stationary support between said frame sides, a rod movably engaged respectively with each of said bars and support, and a spring for each of said rods and operating between the bars and support.

4. In an apparatus of the class described, a shaft having a crank directed obliquely to the longitudinal axis thereof, a bar rotative relative to said crank, a stationary support, a rod movable at one end through said support and movably coupled at the other end to said bar, and a spring between said bar and support.

5. In an apparatus of the class described, a shaft having a crank directed obliquely to the longitudinal axis thereof, a bar rotative relative to said crank, a stationary support, a socket device attached to said bar, a rod movable at one end through said support and movably engaging at the other end in said socket, and a spring bearing at the ends between said socket and support.

6. In an apparatus of the class described, a shaft having a crank directed obliquely to the longitudinal axis thereof, a bar rotative relative to said crank, a stationary support, a rod movable at one end relative to said support and movably engaging at the other end with said bar, and means for yieldably supporting said bar.

In testimony whereof, I affix my signature hereto.

AUGUST BERGGREN.